US009542941B1

United States Patent
Weksler et al.

(10) Patent No.: US 9,542,941 B1
(45) Date of Patent: Jan. 10, 2017

(54) SITUATIONALLY SUSPENDING WAKEUP WORD TO ENABLE VOICE COMMAND INPUT

(71) Applicant: Lenovo (Singapore) Pte. Ltd., New Tech Park (SG)

(72) Inventors: Arnold S. Weksler, Raleigh, NC (US); John Carl Mese, Cary, NC (US); Nathan J. Peterson, Oxford, NC (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 14/872,587

(22) Filed: Oct. 1, 2015

(51) Int. Cl.
*G10L 15/22* (2006.01)

(52) U.S. Cl.
CPC ........................................ *G10L 15/22* (2013.01)

(58) Field of Classification Search
CPC ............... G10L 15/22; G10L 2015/223; G10L 2015/088; G10L 15/08; G10L 15/32; G10L 17/22; G10L 15/18; G10L 15/02; G10L 15/20; G10L 15/265; G10L 15/197; G10L 15/28; G10L 15/30; G10L 13/033; G10L 17/24
See application file for complete search history.

(56) References Cited

U.S. PATENT DOCUMENTS

| | | | | |
|---|---|---|---|---|
| 8,719,039 B1* | 5/2014 | Sharifi | ................... | G10L 15/08 |
| | | | | 704/231 |
| 8,768,712 B1* | 7/2014 | Sharifi | ................... | G10L 15/08 |
| | | | | 704/270 |
| 9,112,984 B2* | 8/2015 | Sejnoha | ............ | H04M 1/72519 |
| 9,245,527 B2* | 1/2016 | Lindahl | ................... | G10L 15/32 |
| 9,256,269 B2* | 2/2016 | Mallinson | ............ | G06F 1/3206 |
| 9,257,120 B1* | 2/2016 | Alvarez Guevara | ... | G10L 15/08 |
| 9,263,042 B1* | 2/2016 | Sharifi | ................... | G10L 15/22 |
| 9,286,892 B2* | 3/2016 | Mengibar | ............... | G10L 15/18 |
| 9,318,107 B1* | 4/2016 | Sharifi | .................... | G10L 15/08 |
| 9,361,885 B2* | 6/2016 | Ganong, III | ............ | G10L 15/22 |
| 9,373,321 B2* | 6/2016 | Bapat | ...................... | G10L 15/06 |
| 9,384,738 B2* | 7/2016 | Foerster | .................. | G10L 17/22 |
| 9,418,656 B2* | 8/2016 | Foerster | ................. | G10L 15/20 |
| 9,424,841 B2* | 8/2016 | Foerster | ................. | G10L 15/02 |
| 2005/0033582 A1* | 2/2005 | Gadd | ...................... | G06Q 30/02 |
| | | | | 704/277 |
| 2013/0339028 A1* | 12/2013 | Rosner | .................. | G10L 15/222 |
| | | | | 704/275 |

(Continued)

OTHER PUBLICATIONS

Ming Qian, Song Wang, John Weldon Nicholson, "Activating Voice Assistant Based on at Least One of User Proximity and Context", file history of related U.S. Appl. No. 15/217,426, filed Jul. 22, 2016.

(Continued)

*Primary Examiner* — Matthew Baker
(74) *Attorney, Agent, or Firm* — John L. Rogitz; John M. Rogitz

(57) ABSTRACT

In one aspect, devices and methods are disclosed for receiving at least one signal from at least one sensor and, based on analyzing the at least one signal, situationally suspending a necessity of receiving a wakeup word to enable voice command input to a computer.

20 Claims, 8 Drawing Sheets

(56) References Cited

U.S. PATENT DOCUMENTS

| | | | |
|---|---|---|---|
| 2014/0229184 A1* | 8/2014 | Shires | H04L 12/12 704/275 |
| 2015/0154954 A1* | 6/2015 | Sharifi | G10L 15/08 704/251 |
| 2015/0221305 A1* | 8/2015 | Sharifi | G10L 15/26 704/235 |
| 2015/0230171 A1* | 8/2015 | Sun | H04W 52/0245 455/41.2 |
| 2015/0248885 A1* | 9/2015 | Koulomzin | G10L 15/08 704/251 |
| 2016/0217790 A1* | 7/2016 | Sharifi | G10L 15/08 |

OTHER PUBLICATIONS

Ming Qian, Song Wang, "Systems and Methods for Activating a Voice Assistant and Providing an Indicator that the Voice Assistant Has Assistance to Give", file history of related U.S. Appl. No. 15/217,533, filed Jul. 22, 2016.

James Anthony Hunt, Russell Speight Vanblon, John Carl Mese, "Natural Language Voice Assistant", file history of related U.S. Appl. No. 15/215,099, filed Jul. 20, 2016.

\* cited by examiner

SITUATIONALLY SUSPENDING WAKEUP WORD TO ENABLE VOICE COMMAND INPUT

FIELD

The present application relates generally to situationally suspending wakeup word enablement of voice command input to a computer.

BACKGROUND

In addition to using manipulate buttons, wakeup words can be required to enable voice input to computers. However, the requirement for the user to speak the wakeup word can be inconvenient.

SUMMARY

As understood herein, wakeup words may be helpful in some situations but not in others.

Accordingly, in one aspect a device includes a processor, a microphone accessible to the processor, and storage accessible to the processor. The storage bears instructions executable by the processor to, responsive to first sensor input indicating a first situation, require reception of a predetermined wakeup word received through the microphone to enable voice command input. The instructions are also executable to, responsive to second sensor input indicating a second situation, suspend a need to receive a predetermined wakeup word received through the microphone to enable voice command input and instead immediately process commands received through the at least one microphone without first receiving the wakeup word.

In some examples the sensor input is from at least one camera. In some examples the sensor input is from at least one microphone. In other examples the sensor input is from at least one Bluetooth receiver. In yet other examples the sensor input is from at least one motion sensor. In still other embodiments the sensor input is from at least one vehicle occupancy sensor. The sensor input may be from a combination of any two or more of the above sensors.

In another aspect, a computer readable storage medium that is not a transitory signal comprises instructions executable by a processor to receive a signal from at least one sensor, determine whether the signal indicates a presence of multiple people, enable wakeup word enablement of voice command input responsive to a determination that the signal indicates a presence of multiple people, and disable wakeup word enablement of voice command input responsive to a determination that the signal does not indicate a presence of multiple people.

In still another aspect, a method includes receiving at least one signal from at least one sensor and, based on analyzing the at least one signal, situationally suspending a necessity of receiving a wakeup word to enable voice command input to a computer.

The details of present principles, both as to their structure and operation, can best be understood in reference to the accompanying drawings, in which like reference numerals refer to like parts, and in which:

DETAILED DESCRIPTION

Figure 1:
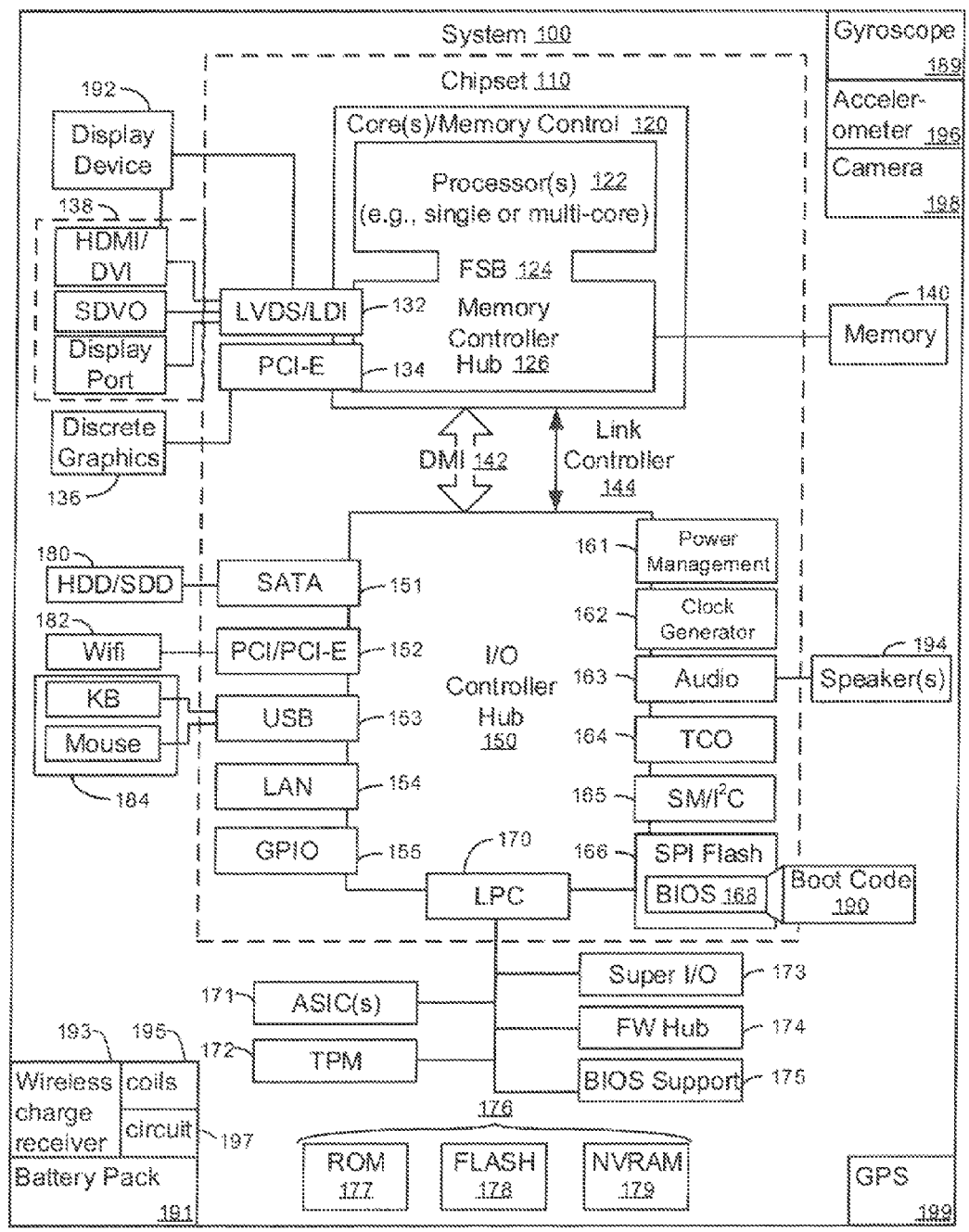
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilia or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the Yoga™ series of convertible computers or a ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®. Or, the system 100 may include a wireless telephone, notebook computer, or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof; but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.). Other input devices may include vehicle occupant sensors such as seat sensors that responsive to weight being sensed generate a signal indicating a person is sitting in the seat. In such as case the signal may be sent to an engine control module (ECM) of a vehicle and used by the ECM according to discussion below to enable and disable wakeup word voice input, or the ECM may send the signal via, e.g., Bluetooth to the processor of a CE device to enable the CE device processor to enable and disable wakeup word control according to principles below.

The input device 184 may also be, e.g., a microphone for receiving voice input, an infrared (IR) sensor that in some examples can be embodied in a motion sensor system, and/or a thermal imager for use in accordance with present principles.

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, the system 100 may also include at least one battery pack 191 comprising at least one battery. The battery pack 191 may be in jelly roll format or pouch cell format and may be a Lithium ion battery. The battery pack 191 is electrically coupled to and powers the system 100, and can also be electrically coupled to at least one wireless charge receiver 193 that is configured for receiving a wireless charge via a magnetic field from a wireless charge transmitter (not shown) using, e.g., inductive wireless charging principles and/or resonant inductive coupling principles. Thus, the receiver 193 may comprise plural coils 195. The coils 195 may respectively comprise at least one wire disposed around a magnet, and may be configured for receiving power from the wireless charge transmitter via the magnetic/electromagnetic field created by the transmitter when activated. The receiver 193 can also include at least one circuit 197 (in some embodiments only one circuit may be included, while in other embodiments plural circuits may be included) configured for receiving current from the coils 195 and doing at least one of: providing current to the system 100 to power it and providing current to the battery pack 191 to charge at least one battery in the pack 191. The circuit 197 may be an Rx circuit, and/or the circuit 197 may include one or more of a converter(s), a regulator(s), and/or a communicator(s).

Additionally, the system 100 may include a gyroscope 189 for sensing and/or measuring the orientation of the system 100 and providing input related thereto to the processor 122, an accelerometer 196 for sensing acceleration and/or movement of the system 100 and providing input related thereto to the processor 122, and a camera 198 for gathering one or more images and providing input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, the system 100 may include a GSP transceiver 199 that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
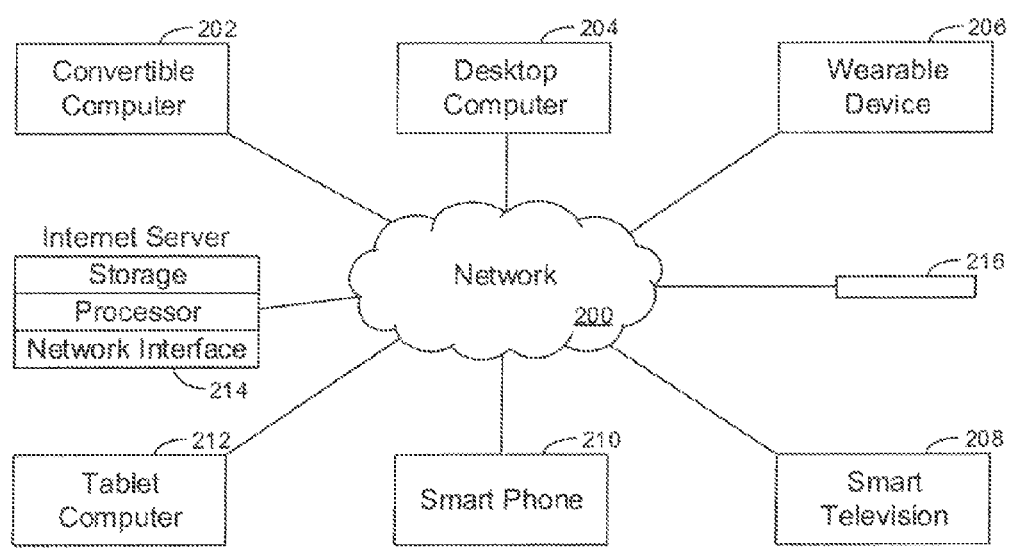
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212.

Also shown in FIG. 2 is a wireless charge transmitter 216 configured for providing, to a wireless charge receiver, a wireless charge via a magnetic field using, e.g., inductive wireless charging principles and/or resonant inductive coupling principles. Thus, the wireless charge transmitter 216 may comprise at least one coil, and may be engaged (e.g., conductively coupled) to a wall outlet or other power source. It is to be understood that the devices 202-216 are configured to communicate with each other over the network 200.

FIGS. 3-7 illustrate example logic that may be implemented as instructions on a computer memory for execution thereof by any of the above-described processors.

Figure 3:
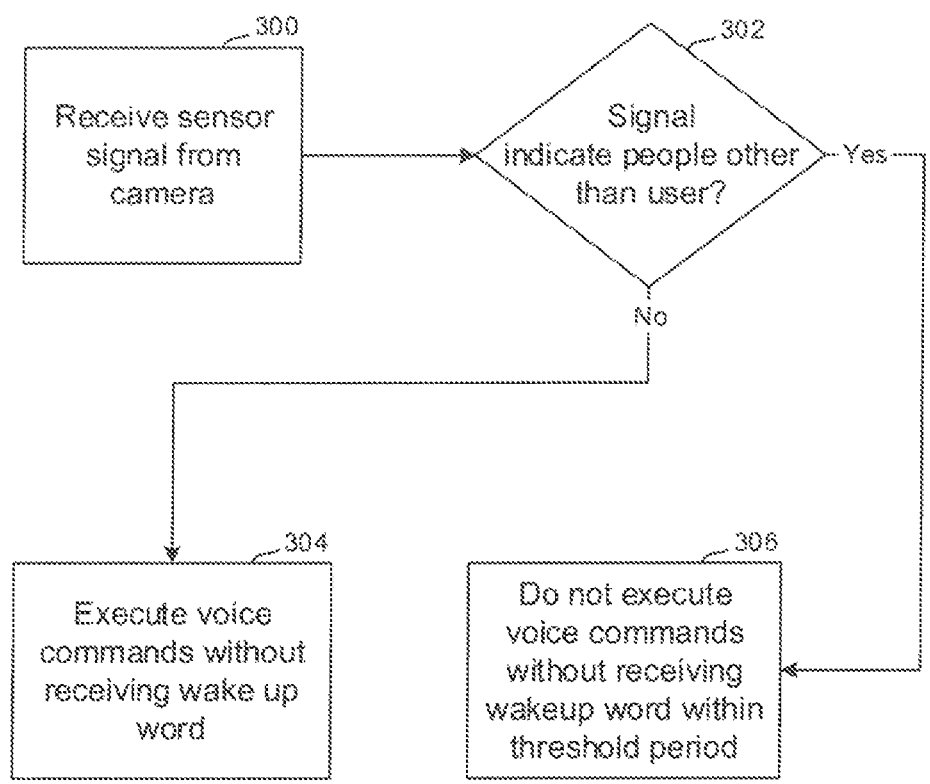
FIGS. 3-7 are flaw charts of example logic consistent with present principles.

Referring now to FIG. 3, at block 300 a sensor signal is received from a camera such as the above-described camera. The sensor signal may include one or more images of faces. At decision diamond 302 it is determined whether the signal indicates whether multiple people are present. This may be done by executing an image recognition engine on the signal to determine how many faces are in the image. The presence of multiple faces can result in a "yes" result. In some embodiments the test may further include determining, using an image of a specific user of the device loaded into the device memory during an initialization phase, whether people other than the specific user are present. In such an embodiment, the test may further include inferring whether any of the other faces are within a predetermined range of the specific user by, e.g., determining an absolute size of the other faces or a relative size of the other faces relative to the size of the face of the user as imaged by the camera. Only if another person is inferred to be within the predetermined range of the specific user is a "yes" result returned.

If the decision at diamond 302 returns a "no" result, the logic can proceed to block 304 to execute any voice commands as received through the microphone of the device without first requiring reception of the wakeup word. It is to be understood that voice signals are processed using a voice recognition engine into commands.

In contrast, if a "yes" result is returned at diamond 302, the logic can move to block 306 to disable execution of voice signals received through the microphone as commands unless a predetermined wakeup word, which may be set by the manufacturer or established by the user during initialization, is first received, typically within a predetermined prologue period of, for instance, several seconds prior to receiving subsequent voice commands. Such voice signals may nonetheless be recorded but will not be executed as commands unless the wakeup word is received within the prologue period.

Figure 4:
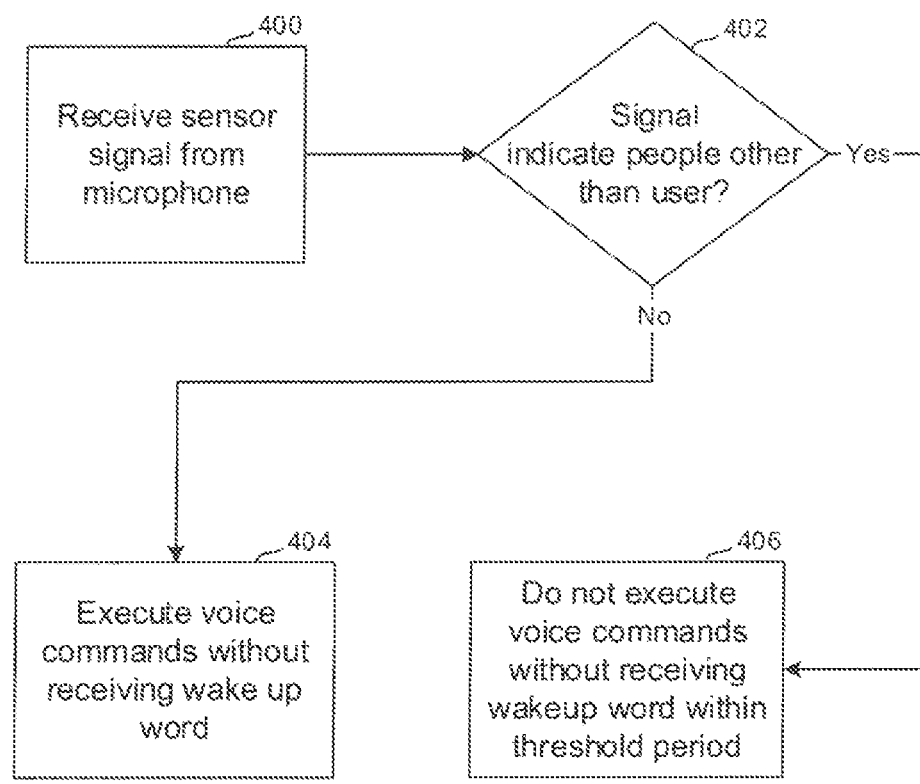

Referring now to FIG. 4, at block 400 a sensor signal is received from a microphone such as the above-described microphone. The sensor signal may include one or more voices. At decision diamond 402 it is determined whether the signal indicates whether multiple people are present. This may be done by executing a voice recognition engine on the signal to determine how many voices are in the image. The presence of multiple voices can result in a "yes" result. In some embodiments the test may further include determining, using a voice fingerprint of a specific user of the device loaded into the device memory during an initialization phase, whether people other than the specific user are present. In such an embodiment, the test may further include inferring whether any of the other voices are within a predetermined range of the specific user by, e.g., determining an absolute amplitude of the volume of the other voices or a relative amplitude of the other voices relative to the amplitude of the voice of the user. Only if another person is inferred to be within the predetermined range of the specific user is a "yes" result returned.

If the decision at diamond 402 returns a "no" result, the logic can proceed to block 404 to execute any voice commands as received through the microphone of the device without first requiring reception of the wakeup word. In contrast, if a "yes" result is returned at diamond 402, the logic can move to block 406 to disable execution of voice signals received through the microphone as commands unless a predetermined wakeup word, which may be set by the manufacturer or established by the user during initialization, is first received, typically within a predetermined prologue period of, for instance, several seconds prior to receiving subsequent voice commands. Such voice signals may nonetheless be recorded but will not be executed as commands unless the wakeup word is received within the prologue period.

Figure 5:
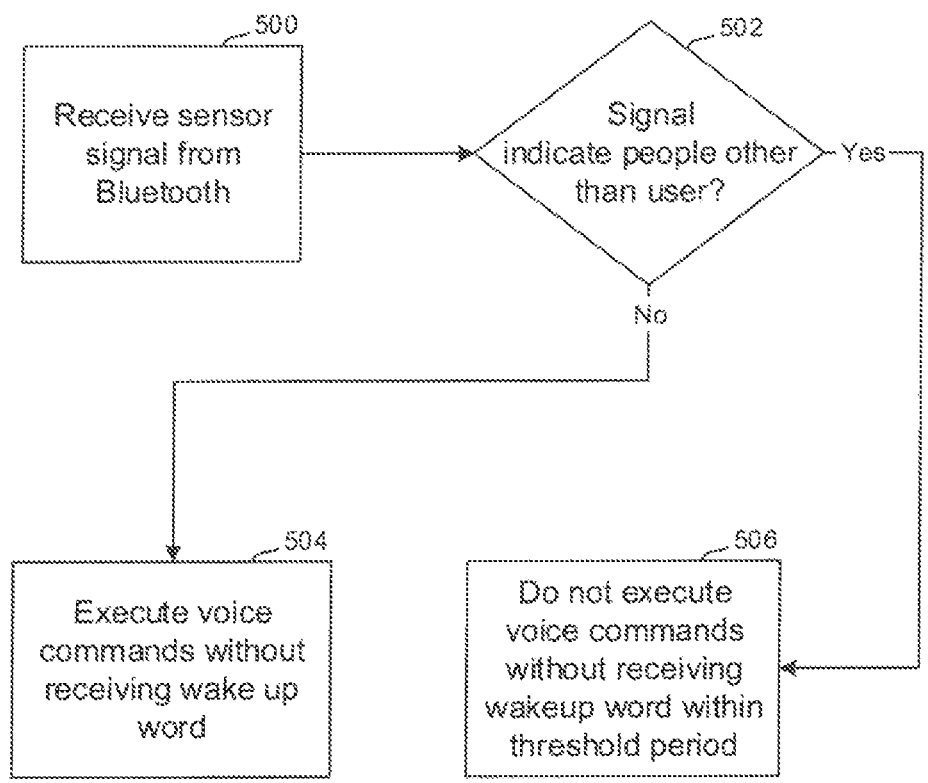

Referring now to FIG. 5, at block 500 a sensor signal is received from a Bluetooth receiver associated with the device. The sensor signal may include one or more Bluetooth pairing signals. At decision diamond 502 it is determined whether the signal indicates whether multiple people are present. This may be done by determining whether the device is paired with another device. The presence of another paired device can result in a "yes" result. In some embodiments the test may further include inferring whether any of the other people are within a predetermined range of the specific user by, e.g., determining a Bluetooth signal strength from any device paired with the device executing the logic of FIG. 5. Only if another person (using his paired device as a proxy) is inferred to be within the predetermined range of the specific user is a "yes" result returned.

If the decision at diamond 502 returns a "no" result, the logic can proceed to block 504 to execute any voice commands as received through the microphone of the device without first requiring reception of the wakeup word. In contrast, if a "yes" result is returned at diamond 502, the logic can move to block 506 to disable execution of voice signals received through the microphone as commands unless a predetermined wakeup word, which may be set by the manufacturer or established by the user during initialization, is first received, typically within a predetermined prologue period of, for instance, several seconds prior to receiving subsequent voice commands. Such voice signals may nonetheless be recorded but will not be executed as commands unless the wakeup word is received within the prologue period.

Figure 6:
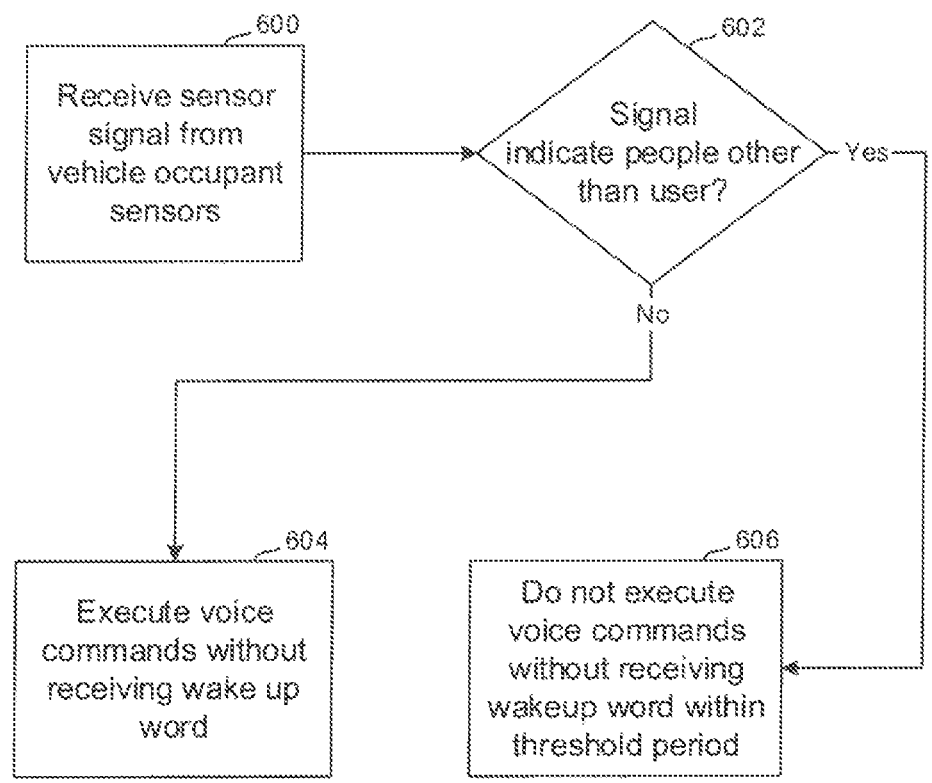

Referring now to FIG. 6, at block 600 a sensor signal is received from a vehicle occupant sensor either relayed through, e.g., an ECM with which the processor of the device executing the logic is paired or, when the ECM itself executes the logic, from the occupant sensor, typically mounted on a seat of the vehicle. At decision diamond 504 it is determined whether the signal indicates whether multiple people are present. This may be done by determining whether multiple occupant sensors indicate that people are present. The presence of another person can result in a "yes" result.

In some embodiments the test may further include inferring whether any of the other people are within a predetermined range of the specific user by, e.g., determining the location of the seat in which the user of the device executing the instructions is seated and the location of the seats associated with occupant sensors indicating people are sitting in them. For example, if the user is driving an the other occupant sensors indicate people in the back seat only, a "no" result may be returned, whereas if the passenger occupant sensor indicates a person is in it, a "yes" result may be returned. Only if another person (using his occupant sensor as a proxy) is inferred to be within the predetermined range of the specific user is a "yes" result returned.

If the decision at diamond 602 returns a "no" result, the logic can proceed to block 604 to execute any voice commands as received through the microphone of the device without first requiring reception of the wakeup word. In contrast, if a "yes" result is returned at diamond 602, the logic can move to block 606 to disable execution of voice signals received through the microphone as commands unless a predetermined wakeup word, which may be set by the manufacturer or established by the user during initialization, is first received, typically within a predetermined prologue period of, for instance, several seconds prior to receiving subsequent voice commands. Such voice signals may nonetheless be recorded but will not be executed as commands unless the wakeup word is received within the prologue period.

Figure 7:
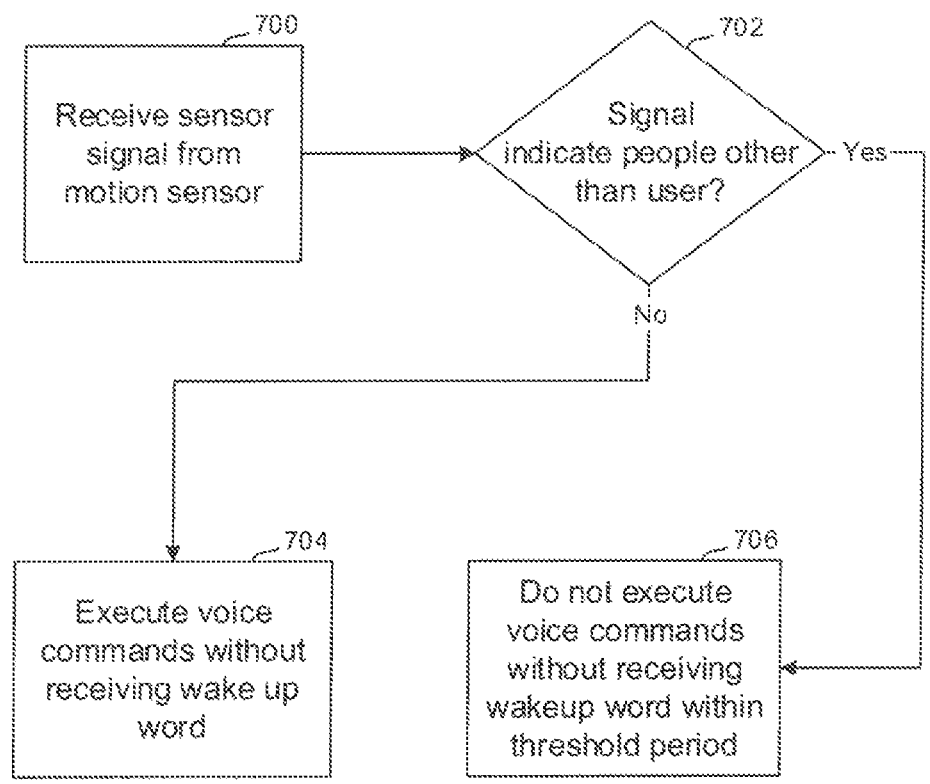

Referring now to FIG. 7, at block 700 a sensor signal is received from a motion sensor such as the above-described motion sensor. The signal may include information that one or more objects are moving near the sensor. At decision diamond 702 it is determined whether the signal indicates whether multiple people are present. This may be done by determining how many objects are sensed as being moving. The presence of multiple objects can result in a "yes" result.

In some embodiments the test may further include determining, whether objects other than the specific user are present. In such an embodiment, the test may further include inferring whether any of the other objects are within a predetermined range of the specific user by, e.g., determining an absolute size of the other objects or a relative size of the other objects relative to the size of the user. Only if another person is inferred to be within the predetermined range of the specific user is a "yes" result returned.

If the decision at diamond 702 retains a "no" result, the logic can proceed to block 704 to execute any voice commands as received through the microphone of the device without first requiring reception of the wakeup word. In contrast, if a "yes" result is returned at diamond 702, the logic can move to block 706 to disable execution of voice signals received through the microphone as commands unless a predetermined wakeup word, which may be set by the manufacturer or established by the user during initialization, is first received, typically within a predetermined prologue period of, for instance, several seconds prior to receiving subsequent voice commands. Such voice signals may nonetheless be recorded but will not be executed as commands unless the wakeup word is received within the prologue period.

Note that situations other than ones described above may be used to automatically enable and disable wakeup word initiation of voice command input. For example, certain times of day (for example, midnight) may be expected to find the user alone, in which case wakeup word initialization is disabled and all voice signals received by the device are treated as voice commands without first having to receive the wakeup word. Other times of day (for example, noon) may be expected to find the user in company, in winch case wakeup word initialization for voice command input is enabled.

Or, locations as determined by the GPS receiver of the device may be used to automatically enable and disable wakeup word initialization of voice command input. For example, certain locations such as office buildings may indicate that the specific user is not alone, enabling wakeup word initialization of voice command input, whereas other locations, such as the specific user's home, may result in automatically disabling wakeup word initialization, in which case all voice signals received by the device are treated as voice commands without first having to receive the wakeup word.

Figure 8:
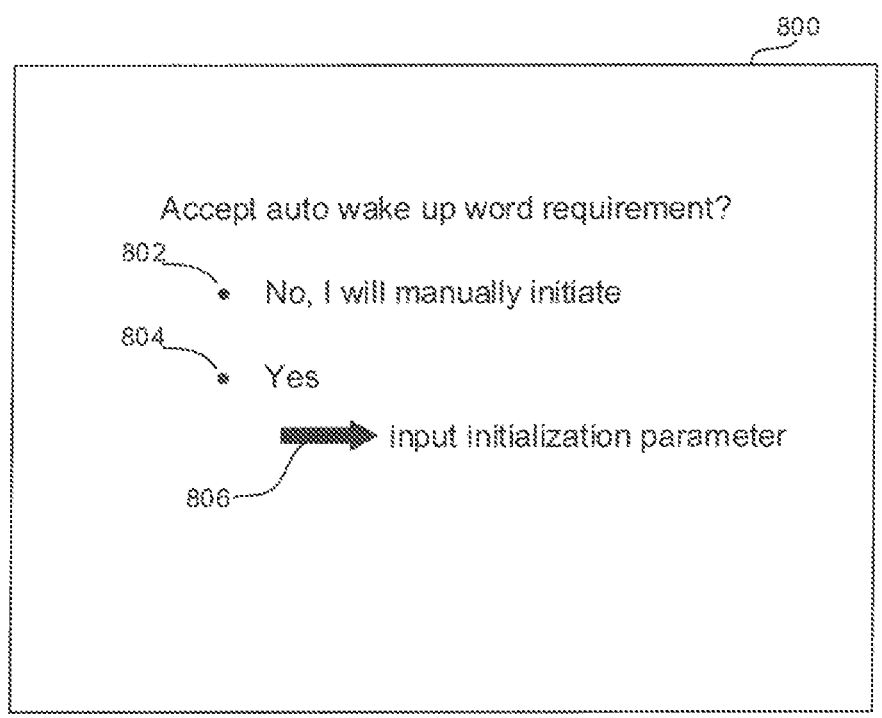
FIG. 8 is an example user interface that may be used consistent with present principles.

FIG. 8 shows that the user may be afforded the choice to accept or not the above-described situational wakeup word enablement using a user interface (UI) 800. As shown, the UI 800 can include a no selector 802 to decline to use automatic wakeup word enablement based on situation. The UI 800 can also include a yes selector 804 to accept to use automatic wakeup word enablement based on situation such as any of the situations discussed above. If yes is selected, an indicator 806 can prompt the user to enter an initialization parameter such as the user's voice or image for purposes described previously.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular SITUATIONALLY SUSPENDING WAKEUP WORD TO ENABLE VOICE COMMAND INPUT is herein shown and described in detail, it is to be understood that the subject matter which is encompassed by the present application is limited only by the claims.

What is claimed is:

1. A device, comprising:
a processor; and
storage accessible to the processor and bearing instructions executable by the processor to:
receive a signal from a sensor;
determine whether the signal indicates a presence of multiple people;
responsive to a determination that the signal indicates a presence of multiple people, enable wakeup word enablement of voice command input; and
responsive to a determination that the signal does not indicate a presence of multiple people, disable wakeup word enablement of voice command input.

2. The device of claim 1, wherein wakeup word enablement of voice command input is identifiable by the processor based on audible input to then enable voice command input using the processor.

3. The device of claim 1, comprising at least one camera, wherein the signal comprises an image from the at least one camera, and wherein the instructions are executable by the processor to:
execute face recognition using the at least one image to determine whether multiple people are present in the at least one image.

4. The device of claim 1, comprising at least one microphone, wherein the signal is from the at least one microphone, and wherein the instructions are executable to:
execute voice recognition using the signal to determine whether multiple people are present.

5. The device of claim 1, comprising at least one Bluetooth receiver, wherein the signal is from the at least one Bluetooth receiver, and wherein the instructions are executable to:
determine, based at least in part on at least one Bluetooth parameter identified from the signal, whether multiple people are present.

6. The device of claim 1, comprising at least one motion sensor, wherein the signal is from the at least one motion sensor, and wherein the instructions are executable to:
determine, based at least in part on the signal, whether multiple people are present.

7. The device of claim 1, wherein the signal is from at least one vehicle occupant sensor, and wherein the instructions are executable to:
determine, based at least in part on the signal, whether multiple people are present.

8. The device of claim 7, comprising the vehicle occupant sensor.

9. The device of claim 1, comprising at least one thermal imager, wherein the signal is from the at least one thermal imager, and wherein the instructions are executable to:
determine, based at least in part on the signal, whether multiple people are present.

10. A computer readable storage medium that is not a transitory signal and that is not a signal per se, the computer readable storage medium comprising instructions executable by a processor to:
receive a signal from at least one sensor;
determine whether the signal indicates a presence of multiple people;
responsive to a determination that the signal indicates a presence of multiple people, enable wakeup word enablement of voice command input; and
responsive to a determination that the signal does not indicate a presence of multiple people, disable wakeup word enablement of voice command input.

11. The computer readable storage medium of claim 10, wherein wakeup word enablement of voice command input is identifiable by the processor based on audible input to then enable voice command input using the processor.

12. The computer readable storage medium of claim 10, wherein the signal comprises an image from at least one camera, and wherein the instructions are executable to:

execute face recognition using the at least one image to determine whether multiple people are present in the at least one image.

13. The computer readable storage medium of claim 10, wherein the signal is from at least one microphone, and wherein the instructions are executable to:

execute voice recognition using the signal to determine whether multiple people are present.

14. The computer readable storage medium of claim 10, wherein the signal is from at least one Bluetooth receiver, and wherein the instructions are executable to:

determine, based at least in part on at least one Bluetooth parameter identified from the signal, whether multiple people are present.

15. The computer readable storage medium of claim 10, wherein the signal is from at least one motion sensor, and wherein the instructions are executable to:

determine, based at least in part on the signal, whether multiple people are present.

16. The computer readable storage medium of claim 10, wherein the signal is from at least one vehicle occupant sensor, and wherein the instructions are executable to:

determine, based at least in part on the signal, whether multiple people are present.

17. A method, comprising:

receiving at least one signal from at least one sensor;

determining, from the at least one signal, that a user is alone;

responsive to determining that the user is alone, suspending a need to receive a wakeup word to enable voice command input to a computer and enabling voice command input to the computer without receiving the wakeup word.

18. The method of claim 17, comprising:

determining, from at least one signal from the at least one sensor, that the user is not alone; and responsive to determining that the user is not alone, enabling voice command input only responsive to receiving the wakeup word.

19. The method of claim 17, wherein the method comprises:

determining whether the signal indicates a presence of multiple people;

responsive to determining that the signal indicates a presence of multiple people, enabling wakeup word enablement of voice command input; and responsive to determining that the signal does not indicate a presence of multiple people, disabling wakeup word enablement of voice command input.

20. The method of claim 17, comprising:

receiving the at least one signal from at least one of: a microphone, a digital camera, and a thermal imager.

* * * * *